United States Patent
Miyazaki (10) Patent No.: US 9,446,627 B2
(45) Date of Patent: Sep. 20, 2016

(54) RUBBER COMPOSITION FOR SIDEWALL AND TIRE USING THE SAME

(75) Inventor: Tatsuya Miyazaki, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 121 days.

(21) Appl. No.: 14/234,657

(22) PCT Filed: May 30, 2012

(86) PCT No.: PCT/JP2012/063909
§ 371 (c)(1),
(2), (4) Date: Jan. 24, 2014

(87) PCT Pub. No.: WO2013/046804
PCT Pub. Date: Apr. 4, 2013

(65) Prior Publication Data
US 2014/0202609 A1    Jul. 24, 2014

(30) Foreign Application Priority Data

Sep. 29, 2011    (JP) .................................. 2011-214288
Mar. 5, 2012     (JP) .................................. 2012-048228

(51) Int. Cl.
*B60C 1/00*    (2006.01)
*C08L 9/00*    (2006.01)
(Continued)

(52) U.S. Cl.
CPC ............ *B60C 1/0025* (2013.04); *B60C 19/086* (2013.04); *C08K 3/04* (2013.01);
(Continued)

(58) Field of Classification Search
CPC ............ B60C 1/0025; B60C 2200/06; B60C 2200/0166; B60C 19/086; C08L 9/00;
C08L 7/00; C08L 3/04; C08L 3/36; C08K 3/04; C08K 3/36; C08K 2201/019
USPC .......................................... 152/525; 524/186
See application file for complete search history.

(56) References Cited

U.S. PATENT DOCUMENTS 4,158,000 A *  6/1979  Nagasaki ............. C08K 5/3437
                                                    524/87
6,302,173 B1   10/2001  Mizuno et al.
(Continued)

FOREIGN PATENT DOCUMENTS

EP    2 014 488 A1   1/2009
EP    2 233 323 A1   9/2010
(Continued)

OTHER PUBLICATIONS

JP 2007-327002 A (2007), machine translation, JPO/INIPIT Japan Platform for Patent Information (J-PlatPat).*
(Continued)

*Primary Examiner* — Susannah Chung
*Assistant Examiner* — Josephine Chang
(74) *Attorney, Agent, or Firm* — Birch, Stewart, Kolasch & Birch, LLP (57) ABSTRACT

An object of the present invention is to provide a rubber composition for a sidewall having excellent conductivity, anti-spew cutting property and extrusion processability in good balance and assuring low production cost. The present invention provides a rubber composition for a sidewall comprising 2 to 15 parts by mass of a wet processed silica having a BET specific surface area of 70 to 250 m$^2$/g and 40 to 62 parts by mass of a carbon black having a BET specific surface area of 37 to 125 m$^2$/g based on 100 parts by mass of a diene rubber component, wherein the rubber composition does not contain a silane coupling agent, and has a volume resistivity of not more than $1 \times 10^8$ Ω·cm.

8 Claims, 1 Drawing Sheet

(51) Int. Cl.
 *C08K 3/04* (2006.01)
 *C08K 3/36* (2006.01)
 *B60C 19/08* (2006.01)
 *C08L 9/02* (2006.01)
(52) U.S. Cl.
 CPC ....... *C08K 3/36* (2013.01); *C08L 9/00* (2013.01); *C08L 9/02* (2013.01); *B60C 2200/06* (2013.04); *C08K 2201/019* (2013.01)

(56) References Cited

U.S. PATENT DOCUMENTS

| | | |
|---|---|---|
| 2007/0215257 A1 | 9/2007 | Uchida et al. |
| 2008/0283165 A1 | 11/2008 | Mafune et al. |
| 2010/0132866 A1 | 6/2010 | Imoto |

FOREIGN PATENT DOCUMENTS

| | | |
|---|---|---|
| JP | 61-44004 A | 3/1986 |
| JP | 7-18120 A | 1/1995 |
| JP | 10-36559 A | 2/1998 |
| JP | 10-77362 A | 3/1998 |
| JP | 11-180108 A | 7/1999 |
| JP | 2003-118310 A | 4/2003 |
| JP | 2004-10866 A | 1/2004 |
| JP | 2006-83301 A | 3/2006 |
| JP | 2007-245918 A | 9/2007 |
| JP | 2007-327002 A | 12/2007 |
| JP | 2008-285070 A | 11/2008 |
| JP | 2009-13218 A | 1/2009 |
| JP | 2009-270044 A | 11/2009 |
| JP | 2010-168540 A | 8/2010 |
| JP | 2011-74332 A | 4/2011 |
| JP | 2011-88458 A | 5/2011 |
| JP | 2011-153222 A | 8/2011 |

OTHER PUBLICATIONS

Office Action dated May 12, 2015 for Korean Application No. 10-2014-7005512 with English Translation.
International Search Report for International Application No. PCT/JP2012/063909, dated Aug. 28, 2012.
Office Action for Japanese Application No. 2012-048228, dated Aug. 21, 2012, including an English translation.
Office Action for Japanese Application No. 2012-048228, dated Oct. 30, 2012, including an English translation.
Search Report dated May 20, 2015 for European Application No. 12834702.8.
"Compounding agent," Rubber Industry Handbook, vol. 2, Chemical Industry Press, Jun. 30, 1981, pp. 1-7.
Chinese Office Action dated Sep. 29, 2015, for Chinese Application No. 201280047701.X with the English translation.

\* cited by examiner

RUBBER COMPOSITION FOR SIDEWALL AND TIRE USING THE SAME

TECHNICAL FIELD

The present invention relates to a rubber composition for a sidewall of a tire, and a tire having a sidewall comprising the rubber composition.

BACKGROUND ART

A rubber composition for a sidewall of a tire is required to be excellent in steering stability, rolling resistance (heat build-up property), durability, crack growth resistance, resistance to scratch, conductivity, anti-spew-cutting property, extrusion processability, and the like. Particularly a rubber composition for a sidewall of general-purpose tires is required to be excellent in conductivity, anti-spew-cutting property and extrusion processability in good balance and be able to be prepared at low cost.

The conductivity of a tire is a property for discharging static electricity accumulated on a vehicle to a ground, and generally static electricity is discharged through a rim, a clinch, a ply, a sidewall, a belt or a breaker, or a tread.

Without such discharging, static electricity is accumulated on a vehicle and there arises a problem such that a person riding on a vehicle receives an electric shock, a spark occurs when filling fuel to cause a fire, mixing of a noise on a radio in a vehicle during running occurs, or corrosion of a rubber composition of a clinch portion due to an electrically charged rim is accelerated.

A rubber composition comprising a high structure carbon black is known for securing conductivity of a rubber composition for a sidewall. However, a high structure carbon black is expensive as compared with usual carbon blacks, and has a problem with cost for the use for a rubber composition for a sidewall of general-purpose tires required to be able to be produced at low cost.

In the case where it is difficult to secure conductivity of a sidewall, it is known, as a technology for discharging without passing through a sidewall, to secure conductivity of a tire by providing an electrically conductive layer having good conductivity at an inner side of a sidewall as described in Patent Document 1. However, since a rubber composition comprising a carbon black as a main filler is used for the electrically conductive layer, there is a problem in using this rubber composition for general-purpose tires from the viewpoint of deterioration of durability and rolling resistance and increase in production cost due to complexity of the production steps.

Further, as a technology for discharging without passing through a sidewall, it is known to improve conductivity of a ply topping rubber layer for discharging through a rim, a clinch, a ply topping rubber, a belt or a breaker, or a tread. However, since a rubber composition comprising a carbon black as a main filler is used as the ply topping rubber and the ply topping rubber layer is thickened, there is a problem in using this rubber composition for general-purpose tires from the viewpoint of deterioration of heat build-up property, durability and rolling resistance of the ply.

It is said that the spew cutting arises at de-molding during the tire production process and is related to breaking resistance (TB) and elongation at break (EB) of a rubber composition at a high temperature (140° C.). Therefore, in order to prevent lowering of EB and TB at high temperatures, countermeasures are taken, such as large increase in a content of natural rubber in a rubber component and increase in contents of zinc oxide and a mold release agent, but in applying these countermeasures for general-purpose tires, there is problem with cost.

Patent Document 2 describes a rubber composition for a sidewall of a tire which enables the tire to have excellent rolling resistance, abrasion resistance and wet performance and a small electric resistance, by comprising a specific carbon black, silica and a silane coupling agent in predetermined amounts. However, in the rubber composition for a sidewall of a tire of Patent Document 2 comprising a silane coupling agent in a predetermined amount, there is a problem with cost, and neither anti-spew-cutting property nor extrusion processability is considered.

PRIOR ART DOCUMENT

Patent Documents

Patent Document 1: JP 2007-245918 A
Patent Document 2: JP 10-036559 A

SUMMARY OF THE INVENTION

Problem to be Solved by the Invention

It is an object of the present invention to provide a rubber composition for a sidewall which is excellent in conductivity, anti-spew-cutting property and extrusion processability in good balance and is excellent from the viewpoint of production cost.

Means to Solve the Problem

The present invention relates to a rubber composition for a sidewall comprising 2 to 15 parts by mass of a wet processed silica having a BET specific surface area of 70 to 250 m$^2$/g and 40 to 62 parts by mass of a carbon black having a BET specific surface area of 37 to 125 m$^2$/g based on 100 parts by mass of a diene rubber component, wherein the rubber composition does not contain a silane coupling agent, and has a volume resistivity of not more than $1\times10^8$ Ω·cm.

It is preferable that the BET specific surface area of the carbon black is 37 to 50 m$^2$/g, and a content of the carbon black is 40 to 60 parts by mass based on 100 parts by mass of the rubber component, and is 26 to 36% by mass in the rubber composition.

It is preferable that the BET specific surface area of the carbon black is 65 to 85 m$^2$/g, and a content of the carbon black is 40 to 55 parts by mass based on 100 parts by mass of the rubber component, and is 24.5 to 36% by mass in the rubber composition.

The present invention further relates to a tire having a sidewall comprising the above-mentioned rubber composition for a sidewall.

The present invention still further relates to an all-steel radial tire having a sidewall comprising the above-mentioned rubber composition for a sidewall.

Effects of the Invention

The present invention can provide the rubber composition for a sidewall which is excellent in conductivity, anti-spew-cutting property and extrusion processability in good balance and is excellent from the viewpoint of production cost since a wet processed silica and a carbon black, which have a specific BET specific surface area, are contained in the predetermined amounts based on the diene rubber component, does not contain a silane coupling agent, and has a specific volume resistivity, and can provide the tire having the sidewall comprising the rubber composition.

EMBODIMENT FOR CARRYING OUT THE INVENTION

The rubber composition for a sidewall of the present invention can improve conductivity, anti-spew-cutting property and extrusion processability in good balance without increasing a production cost since the rubber composition comprises 2 to 15 parts by mass of the wet processed silica having a BET specific surface area of 70 to 250 m$^2$/g and 30 to 65 parts by mass of the carbon black having a BET specific surface area of 37 to 125 m$^2$/g based on 100 parts by mass of the diene rubber component, does not contain a silane coupling agent, and has a volume resistivity of not more than 1×10$^8$ Ω·cm.

In the present invention, examples of the diene rubber include a natural rubber (NR), an isoprene rubber (IR), a butadiene rubber (BR), a styrene-butadiene rubber (SBR), a styrene-isoprene rubber (SIR), a styrene-isoprene-butadiene rubber (SIBR), an ethylene-propylene-diene rubber (EPDM), a chloroprene rubber (CR), an acrylonitrile-butadiene rubber (NBR), a butyl rubber (IIR), and the like, and these diene rubber components may be used alone or at least 2 kinds thereof may be used in combination. Among these, it is preferable to use NR and BR from the viewpoint of excellent crack growth resistance, elongation at break, breaking resistance, heat build-up property and extrusion processability.

NR is not limited particularly, and those which are commonly used in a rubber industry can be used. For example, there are SIR20, RSS#3, TSR20, and the like.

In the case of the diene rubber component comprising NR, an amount of NR is preferably not less than 30% by mass, more preferably not less than 35% by mass. If the amount of NR is less than 30% by mass, elongation at break and breaking resistance tend to be insufficient. Further, the amount of NR is preferably not more than 70% by mass, more preferably not more than 65% by mass, further preferably not more than 60% by mass. If the amount of NR exceeds 70% by mass, crack growth resistance and reversion resistance tend to be insufficient.

Examples of BR include a high-cis 1,4-polybutadiene rubber (high-cis BR), a butadiene rubber containing 1,2-syndiotactic polybutadiene crystals (SPB-containing BR), a modified butadiene rubber (modified BR), a rare-earth-metal-catalyzed BR, and the like, and these BRs may be used alone or at least 2 kinds thereof may be used in combination.

The above-mentioned high-cis BR is a butadiene rubber having a content of cis 1,4 bonds of not less than 90% by mass.

The above-mentioned SPB-containing BR is not one in which syndiotactic polybutadiene crystals are simply dispersed in BR but preferably are dispersed after chemically bonding with BR. Since 1,2-syndiotactic polybutadiene crystals in the rubber composition are aligned in the spew cavities at molding of a tire, hardness and strength of the rubber composition are improved, and occurrence of cutting of spews at de-molding of a tire can be inhibited effectively.

The melting point of 1,2-syndiotactic polybutadiene crystal is preferably at least 180° C., more preferably at least 190° C. If the melting point is lower than 180° C., the crystals melts while a tire is vulcanized at a press and the hardness tends to be lowered. Also, the melting point of 1,2-syndiotactic polybutadiene crystal is preferably at most 220° C., more preferably at most 210° C. If the melting point is more than 220° C., dispersibility in the rubber composition tends to be deteriorated and extrusion processability tends to be deteriorated since the molecular weight of BR becomes large.

In the SPB-containing BR, an amount of an insoluble matter in a boiling n-hexane is preferably not less than 2.5% by mass, more preferably not less than 8% by mass. If the amount is less than 2.5% by mass, sufficient hardness of the rubber composition tends not to be obtained. Further, the amount of an insoluble matter in a boiling n-hexane is preferably not more than 22% by mass, more preferably not more than 20% by mass, further preferably not more than 18% by mass. If the amount exceeds 22% by mass, the viscosity of the BR itself is high and there is a tendency that dispersibility of the BR and filler in the rubber composition is deteriorated. Here, the insoluble matter in a boiling n-hexane is 1,2-syndiotactic polybutadiene in the SPB-containing BR.

In the SPB-containing BR, an amount of 1,2-syndiotactic polybutadiene crystals is preferably not less than 2.5% by mass, more preferably not less than 10% by mass. If the amount is less than 2.5% by mass, the rubber hardness tends to be insufficient. Further, in the BR, the amount of 1,2-syndiotactic polybutadiene crystals is preferably not more than 20% by mass, more preferably not more than 18% by mass. If the amount is more than 20% by mass, there is a tendency that the BR is hardly dispersed in the rubber composition and processability is deteriorated.

The modified BR is preferably one which is obtained by polymerizing 1,3-butadiene with a lithium initiator and then adding a tin compound and in which the terminal of the modified BR molecule is bonded by tin-carbon bonding.

Examples of the lithium initiator include lithium compounds such as alkyllithium, aryllithium, vinyl lithium, organotin lithium compounds and organonitrogen lithium compound, lithium metals, and the like. The modified BR having a high vinyl content and a low cis content can be obtained by using the above-mentioned lithium initiator for the modified BR.

Examples of tin compounds include tin tetrachloride, butyltin trichloride, dibutyltin dichloride, dioctyltin dichloride, tributyltin chloride, triphenyltin chloride, diphenyldibutyltin, triphenyltin ethoxide, diphenyl-dimethyltin, ditolyltin chloride, diphenyltin dioctanoate, divinyl-diethyltin, tetrabenzyltin, dibutyltin distearate, tetraallyltin, p-tributyltin styrene, and the like. These tin compounds may be used alone or two or more kinds thereof may be used in combination.

A content of tin atoms in the modified BR is preferably not less than 50 ppm, more preferably not less than 60 ppm. If the content of tin atoms is less than 50 ppm, there is a tendency that the effect of the tin atoms to accelerate dispersion of a carbon black in the modified BR is small and the tan δ increases. Further, the content of tin atoms is preferably not more than 3,000 ppm, more preferably not more than 2,500 ppm, further preferably not more than 250 ppm. If the content of tin atoms exceeds 3,000 ppm, cohesiveness of the kneaded product becomes poor and edge becomes uneven, and thus extrusion processability tends to deteriorate.

Molecular weight distribution (Mw/Mn) of the modified BR is preferably not more than 2, more preferably not more than 1.5. If the Mw/Mn of the modified BR exceeds 2, there is a tendency that dispersibility of a carbon black deteriorates and tan δ increases. In the present invention, the Mw and Mn are values obtained by conversion with standard polystyrene using a gel permeation chromatograph (GPC).

The amount of vinyl bond in the modified BR is preferably not less than 5% by mass, more preferably not less than 7% by mass. If the amount of vinyl bond is less than 5% by mass, polymerization (preparation) of the modified BR tends to be difficult. Further, the amount of vinyl bond in the modified BR is preferably not more than 50% by mass, more preferably not more than 20% by mass. If the amount of vinyl bond exceeds 50% by mass, there is a tendency that dispersibility of a carbon black deteriorates and the tan δ increases.

The above-mentioned rare-earth-metal-catalyzed BR is a butadiene rubber synthesized using a rare earth-containing catalyst and is characterized in that the cis content is high and the vinyl content is low. As a rare-earth-metal-catalyzed BR, those commonly used in production of tires can be used.

As the rare earth-containing catalyst to be used for the synthesis of the rare-earth-metal-catalyzed BR, well-known ones can be used, and examples thereof include catalysts which comprise a lanthanoids-containing compound, an organoaluminum compound, an aluminoxane, or a halogen-containing compound, and optionally comprise a Lewis base. Among these, particularly preferred are Nd containing catalysts using a neodymium (Nd)-containing compound as a lanthanoids-containing compound.

Examples of the lanthanoids-containing compounds include halides, carboxylates, alcoholates, thioalcoholates, and amides of rare earth metals which have atomic numbers 57 through 71. Among these, the above-mentioned Nd-containing catalysts are preferable since a BR having a high cis content and a low vinyl content can be obtained.

As organoaluminum compounds, compounds represented by $AlR^aR^bR^c$ (wherein $R^a$, $R^b$ and $R^c$ are the same or different, and each represents hydrogen or a hydrocarbon group having 1 to 8 carbon atoms) may be used. Examples of aluminoxanes include chain aluminoxanes and cyclic aluminoxanes. Examples of halogen-containing compounds include aluminum halides represented by $AlX_kR^d_{3-k}$ (wherein X represents halogen, $R^d$ represents an alkyl, aryl, or aralkyl group having 1 to 20 carbon atoms, and k represents 1, 1.5, 2 or 3); strontium halides such as $Me_3SrCl$, $Me_2SrCl_2$, $MeSrHCl_2$, and $MeSrCl_3$; and metal halides such as silicon tetrachloride, tin tetrachloride, and titanium tetrachloride. The Lewis base is used for complexing a lanthanoids-containing compound, and suitable examples thereof include acetylacetone, ketone, alcohol, and the like.

In the polymerization of a butadiene, the rare earth-containing catalysts may be used while being dissolved in an organic solvent (such as n-hexane, cyclohexane, n-heptane, toluene, xylene, or benzene), or while being carried on an appropriate carrier such as silica, magnesia, or magnesium chloride. The polymerization condition may be either of solution polymerization or bulk polymerization. The polymerization temperature is preferably −30 to 150° C. and the polymerization pressure may be optionally set depending on other conditions.

A Mooney viscosity $ML_{1+4}$ (100° C.) of the rare-earth-metal-catalyzed BR is preferably not less than 35, more preferably not less than 40. If the Mooney viscosity is less than 35, there is a tendency that the viscosity of the rubber composition is low and a sufficient thickness cannot be obtained after vulcanization. The Mooney viscosity is preferably not more than 55, more preferably not more than 50. If the Mooney viscosity is more than 55, there is a tendency that unvulcanized rubber composition becomes too hard and it is difficult to extrude the rubber composition with a smooth edge. The Mooney viscosity is measured in accordance with ISO289 and JIS K6300.

A ratio of a weight-average molecular weight (Mw) to a number-average molecular weight (Mn) (Mw/Mn) of the rare-earth-metal-catalyzed BR is preferably not less than 1.2, more preferably not less than 1.5. If the ratio is less than 1.2, processability tends to deteriorate significantly. The Mw/Mn is preferably not more than 5, more preferably not more than 4. If the Mw/Mn exceeds 5, heat build-up property tends to deteriorate.

The Mw of the rare-earth-metal-catalyzed BR is preferably not less than 300,000, more preferably not less than 320,000, and is preferably not more than 1,500,000, more preferably not more than 1,300,000. Further, the Mn of the rare-earth-metal-catalyzed BR is preferably not less than 100,000, more preferably not less than 150,000, and is preferably not more than 1,000,000, more preferably not more than 800,000. If the Mw or Mn is less than its preferable lower limit, heat build-up property and elongation at break tend to deteriorate. On the other hand, if the Mw or Mn is more than its preferable upper limit, deterioration of processability becomes a concern. In the present invention, the Mw and the Mn are values calculated by conversion with polystyrene standards using a gel permeation chromatograph (GPC).

The content of cis 1,4 bonds of the rare-earth-metal-catalyzed BR is preferably not less than 90% by mass, more preferably not less than 93% by mass, further preferably not less than 95% by mass. If the content is less than 90% by mass, elongation at break and abrasion resistance tend to be deteriorated.

The vinyl content of the rare-earth-metal-catalyzed BR is preferably not more than 1.8% by mass, more preferably not more than 1.0% by mass, further preferably not more than 0.5% by mass, particularly preferably not more than 0.3% by mass. If the content exceeds 1.8% by mass, elongation at break and abrasion resistance tend to be deteriorated. In the present invention, the vinyl contents (unit quantity of 1,2-bond butadiene) of high cis BR, modified BR and rare-earth-metal-catalyzed BR and the content of cis 1,4 bonds can be determined by infrared absorption spectrum analysis.

Among these various BRs, it is preferable to use the modified BR from the viewpoint of heat build-up property. Further, from the viewpoint of good elongation at break and abrasion resistance, it is preferable to use the rare-earth-metal-catalyzed BR, more preferably to use the BR synthesized with an Nd-containing catalyst, further preferably to use the high cis BR synthesized using an Nd-containing catalyst.

In the case where the rubber composition comprises the BR as a diene rubber component, the content of BR is preferably not less than 30% by mass, more preferably not less than 35% by mass. If the content is less than 30% by mass, there is a tendency that crack growth resistance is inferior and durability of the sidewall is not sufficient. Further, the content of BR is preferably not more than 70% by mass, more preferably not more than 65% by mass, further preferably not more than 60% by mass. If the content is more than 70% by mass, EB and processability tend to deteriorate. When two or more kinds of BRs are used in combination, the content is the total amount of BRs used in combination.

The rubber composition of the present invention comprises a specific wet processed silica.

The BET specific surface area of the wet processed silica is from 70 to 250 m$^2$/g, preferably from 80 to 230 m$^2$/g, more preferably from 100 to 200 m$^2$/g. If the BET specific surface area of the wet processed silica is less than 70 m$^2$/g, elongation at break and abrasion resistance tend to deteriorate and an effect of inhibiting discoloration to brown of the surface of the sidewall tends not to be obtained. On the other hand, if the BET specific surface area of the wet processed silica exceeds 250 m$^2$/g, heat build-up property and processability tend to deteriorate, and there is a tendency that dispersibility of the silica becomes insufficient and an effect of inhibiting discoloration to brown of the surface of the sidewall is not obtained.

The content of the wet processed silica is from 2 to 15 parts by mass, preferably from 3 to 12 parts by mass, more preferably from 5 to 10 parts by mass based on 100 parts by mass of the rubber component. If the content of the wet processed silica is less than 2 parts by mass, there is a tendency that a sufficient cost reduction effect is not obtained, an effect of improving EB and TB is not obtained, and an effect of inhibiting discoloration to brown of the surface of the sidewall is not obtained. On the other hand, if the content of the wet processed silica exceeds 15 parts by mass, there is a tendency that the wet processed silica is re-agglomerated before vulcanized and the rubber composition shrinks at extrusion. Further, in order to prevent the re-agglomeration of the wet processed silica and improve the tan δ, a silane coupling agent needs to be contained in the rubber composition, and the production cost tends to increase.

Then the effect of inhibiting discoloration to brown of the surface of the sidewall by the wet processed silica is explained. The wet processed silica having the BET specific surface area within the above-mentioned range has hydroxyl group on its surface, and since this hydroxyl group undergoes adsorption with a polar group of an antioxidant such as a phenylenediamine antioxidant or a quinone antioxidant, excessive blooming of the antioxidant on the surface of the sidewall can be inhibited. As a result, brown discoloration of the sidewall surface due to excessive blooming of the antioxidant can be inhibited throughout vulcanization, storage and use. Thereby, the content of the antioxidants such as a phenylenediamine antioxidant and a quinone antioxidant can be increased without lowering the effect of inhibiting brown discoloration, and therefore, ozone resistance and crack resistance of the rubber composition for a sidewall can be increased.

The content of the wet processed silica is preferably not more than ⅓, more preferably not more than ¼ of the total amount of fillers contained. If the content of the wet processed silica exceeds ⅓ of the total amount of fillers contained, in order to prevent the re-agglomeration of the wet processed silica and improve the tan δ, a silane coupling agent needs to be contained in the rubber composition, and the production cost tends to increase.

The rubber composition of the present invention comprises a specific carbon black.

The BET specific surface area of the carbon black is from 37 to 125 m$^2$/g, preferably from 37 to 85 m$^2$/g. Particularly from the viewpoint of heat build-up property, 37 to 50 m$^2$/g is more preferable, and particularly from the viewpoint of good side cut resistance and abrasion resistance, 65 to 85 m$^2$/g is more preferable. If the BET specific surface area of the carbon black is less than 37 m$^2$/g, conductivity and elongation at break tend to deteriorate. On the other hand, if the BET specific surface area exceeds 125 m$^2$/g, heat build-up property, shrink resistance and extrusion processability tend to deteriorate.

The content of carbon black having the BET specific surface area of from 37 to 125 m$^2$/g is from 40 to 62 parts by mass, preferably from 40 to 60 parts by mass, more preferably from 40 to 55 parts by mass based on 100 parts by mass of the rubber component. If the content of the carbon black is less than 40 parts by mass, conductivity, shrink resistance and extrusion processability tend to deteriorate. On the other hand, if the content of the carbon black exceeds 62 parts by mass, heat build-up property, elongation at break and extrusion processability tend to deteriorate.

The content of carbon black having the BET specific surface area of from 37 to 125 m$^2$/g in the rubber composition is preferably from 24 to 36% by mass, more preferably from 25 to 32% by mass. If the content of the carbon black in the rubber composition is less than 24% by mass, there is a tendency that conductivity deteriorates and cost increases. On the other hand, if the content of the carbon black in the rubber composition exceeds 36% by mass, elongation at break and anti-spew-cutting property tend to deteriorate.

The content of carbon black having the BET specific surface area of from 37 to 50 m$^2$/g is preferably from 40 to 60 parts by mass, more preferably from 40 to 58 parts by mass based on 100 parts by mass of the rubber component. If the content of the carbon black is less than 37 parts by mass, conductivity, shrink resistance and extrusion processability tend to deteriorate. On the other hand, if the content of the carbon black exceeds 60 parts by mass, elongation at break tends to deteriorate and anti-spew-cutting property and extrusion processability tend to deteriorate.

Further, the content of carbon black having the BET specific surface area of from 37 to 50 m$^2$/g in the rubber composition is preferably from 26 to 36% by mass, more preferably from 27 to 35% by mass. If the content of the carbon black in the rubber composition is less than 26% by mass, conductivity tends to deteriorate and cost tends to increase. On the other hand, if the content of the carbon black in the rubber composition exceeds 36% by mass, elongation at break and anti-spew-cutting property tend to deteriorate.

The content of carbon black having the BET specific surface area of from 65 to 85 m$^2$/g is preferably from 40 to 55 parts by mass, more preferably from 42 to 55 parts by mass based on 100 parts by mass of the rubber component. If the content of the carbon black is less than 40 parts by mass, a volume resistivity tends to become high and conductivity tends to deteriorate. On the other hand, if the content of the carbon black exceeds 55 parts by mass, there is a tendency that EB deteriorates and anti-spew-cutting property and extrusion processability tend to deteriorate.

The content of carbon black having the BET specific surface area of from 65 to 85 m$^2$/g in the rubber composition is preferably from 24.5 to 36% by mass, more preferably from 27 to 35% by mass. If the content of the carbon black in the rubber composition is less than 24.5% by mass, conductivity tends to deteriorate and cost tends to increase. On the other hand, if the content of the carbon black in the rubber composition exceeds 36% by mass, elongation at break, anti-spew-cutting property and extrusion processability tend to deteriorate.

The rubber composition may also comprise fillers commonly used for production of tires such as calcium carbonate, talc and sericite other than the wet processed silica and the carbon black. From the viewpoint of good crack growth resistance and conductivity, it is preferable that the rubber composition mainly comprises carbon black and silica as fillers.

When fillers other than the wet processed silica and the carbon black are contained, the content thereof is preferably not more than 10 parts by mass based on 100 parts by mass of the rubber component. If the content of the fillers other than the wet processed silica and the carbon black exceeds 10 parts by mass, abrasion resistance tends to deteriorate.

The rubber composition of the present invention is featured by containing no silane coupling agent. Since a silane coupling agent is not contained, production cost can be reduced. Further, as mentioned above, the silica is contained in a specific amount, and therefore, sufficient rubber properties and processability can be obtained even without containing a silane coupling agent.

In addition to the above rubber component, wet processed silica and carbon black, the rubber composition of the invention may appropriately comprise compounding agents commonly used in the tire industry, for example, a silica dispersing agent such as polyethylene glycol, a resin, oil, a variety of antioxidants, sulfur, zinc oxide, stearic acid, and a variety of vulcanization accelerators.

The antioxidant is not limited particularly as far as it is one commonly used in the tire industry, and it is preferable to use phenylenediamine antioxidants and/or quinone antioxidants which can improve crack resistance with the effect of inhibiting brown discoloration being maintained when they are used together with the above-mentioned silica.

Examples of the phenylenediamine antioxidants include N-phenyl-N'-(1,3-dimethylbutyl)-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamine, hindered diaryl-p-phenylenediamine, phenylhexyl-p-phenylenediamine, phenyloctyl-p-phenylenediamine, N-phenyl-N'-(3-methacryloyloxy-2-hydroxypropyl)-p-phenylenediamine, and the like. Among these, N-phenyl-N'-(1,3-dimethylbutyl)-p-phenylenediamine (antioxidant 6PPD), N,N'-bis(1,4-dimethylpentyl)-p-phenylenediamine (antioxidant 77PD) or N-phenyl-N'-(3-methacryloyloxy-2-hydroxypropyl)-p-phenylenediamine (antioxidant G-1) is preferable.

Examples of the quinone antioxidants include benzoquinone, hydroquinone, catechol, quinonediimine, and quinomethane antioxidants. Among these, quinonediimine antioxidants are preferable.

Examples of the quinonediimine antioxidants include N-isopropyl-N'-phenyl-p-quinonediimine, N-(1,3-dimethylbutyl)-N'-phenylquinonediimine, N',N-diphenyl-p-quinonediimine, N-cyclohexyl-N'-phenyl-p-quinonediimine, N-n-hexyl-N'-phenyl-p-quinonediimine, N',N-dioctyl-p-quinonediimine, and the like. Among these, N-(1,3-dimethylbutyl)-N'-phenylquinonediimine is preferable.

When the phenylenediamine antioxidants and/or quinone antioxidants are contained, the content thereof is preferably from 2.0 to 10 parts by mass, more preferably from 2.5 to 6.0 parts by mass based on 100 parts by mass of the rubber component. If the content of these antioxidants is less than 2.0 parts by mass, there is a tendency that an effect of improving crack resistance tends to become insufficient.

Further, if the content of these antioxidants exceeds 10 parts by mass, there is a tendency that a crosslink density decreases, E* decreases and heat build-up property deteriorates, and particularly the antioxidant 6PPD is not preferable since cost increases.

Further, in addition to the phenylenediamine antioxidants and/or quinone antioxidants, it is preferable that the rubber composition comprises 2,2,4-trimethyl-1,2-dihydroquinoline polymer (antioxidant TMQ) which is a quinolone antioxidant, and 2,2-methylenebis(4-ethyl-6-t-butylphenol) (antioxidant NS-5) and 2,2-methylenebis(4-methyl-6-t-butylphenol) (antioxidant NS-6) which are bisphenol antioxidants, from the viewpoint that crack resistance and resistance to deterioration by oxidation can be increased.

When the antioxidant TMQ is contained, the content thereof is preferably from 0.1 to 4.0 parts by mass, more preferably from 0.6 to 2.0 parts by mass based on 100 parts by mass of the rubber component. If the content thereof is less than 0.1 part by mass, an effect of increasing crack resistance and resistance to deterioration by oxidation tends to be insufficient. If the content exceeds 4.0 parts by mass, there is a tendency that an effect of increasing crack resistance is saturated and further, heat build-up property is deteriorated.

A volume resistivity of the rubber composition of the present invention is not more than $1 \times 10^8$ Ω·cm, preferably not more than $1 \times 10^7$ Ω·cm, more preferably not more than $1 \times 10^6$ Ω·cm. If the volume resistivity exceeds $1 \times 10^8$ Ω·cm, the sidewall cannot be used as an electrically conductive path from the clinch to the tread, and any defects tend to arise due to accumulation of static electricity on a vehicle. In the case where a countermeasure for securing conductivity of a tire is taken by newly providing a conductive layer being excellent in conductivity or using a ply topping rubber layer as an electrically conductive path, a cost for a tire increases or heat build-up property of a tire tends to deteriorate since a rubber composition comprising a carbon black as a main filler is used for the ply topping rubber layer. In addition, the lower limit of the volume resistivity is not restricted particularly.

It is preferable that the rubber composition of the present invention is used for sidewalls of radial tires for passenger cars, all-steel radial tires and general-purpose tires for industrial vehicles. Especially in the case of a rubber composition comprising a carbon black having a BET specific surface area of from 65 to 85 $m^2/g$, it is preferable that the rubber composition is used for sidewalls of all-steel radial tires and tires for industrial vehicles (radial tires or bias ply tires).

The all-steel radial tires are used for heavy load application for truck tires and the like, and required to be excellent in side cut resistance and abrasion resistance. Therefore, it is preferable to use a carbon black having a BET specific surface area of from 65 to 85 $m^2/g$ for rubber compositions to be used for sidewalls of all-steel radial tires. Here, ply cords of all-steel radial tires are made of steel, the ply is excellent in conductivity. However, in the case where there is a strip layer between a breaker and a ply, it is difficult to discharge through the ply as an electrically conductive path, and therefore, it is preferable to discharge through the sidewall as an electrically conductive path.

The rubber composition for a sidewall of the present invention is prepared by a usual method. Namely, the rubber composition for a sidewall of the present invention can be prepared by kneading the above-mentioned rubber component and other compounding agents according to necessity and then carrying out vulcanization.

The tire of the present invention is manufactured by a usual method using a sidewall produced using the rubber composition for a sidewall of the present invention. Namely, the rubber composition for a sidewall of the present invention in an unvulcanized state is subjected to extrusion into a shape of a sidewall of a tire and then is laminated with other tire parts on a tire molding machine by a usual method, to form an unvulcanized tire. The unvulcanized tire is heated and pressed in a vulcanizer to obtain the tire of the present invention.

Figure 1:
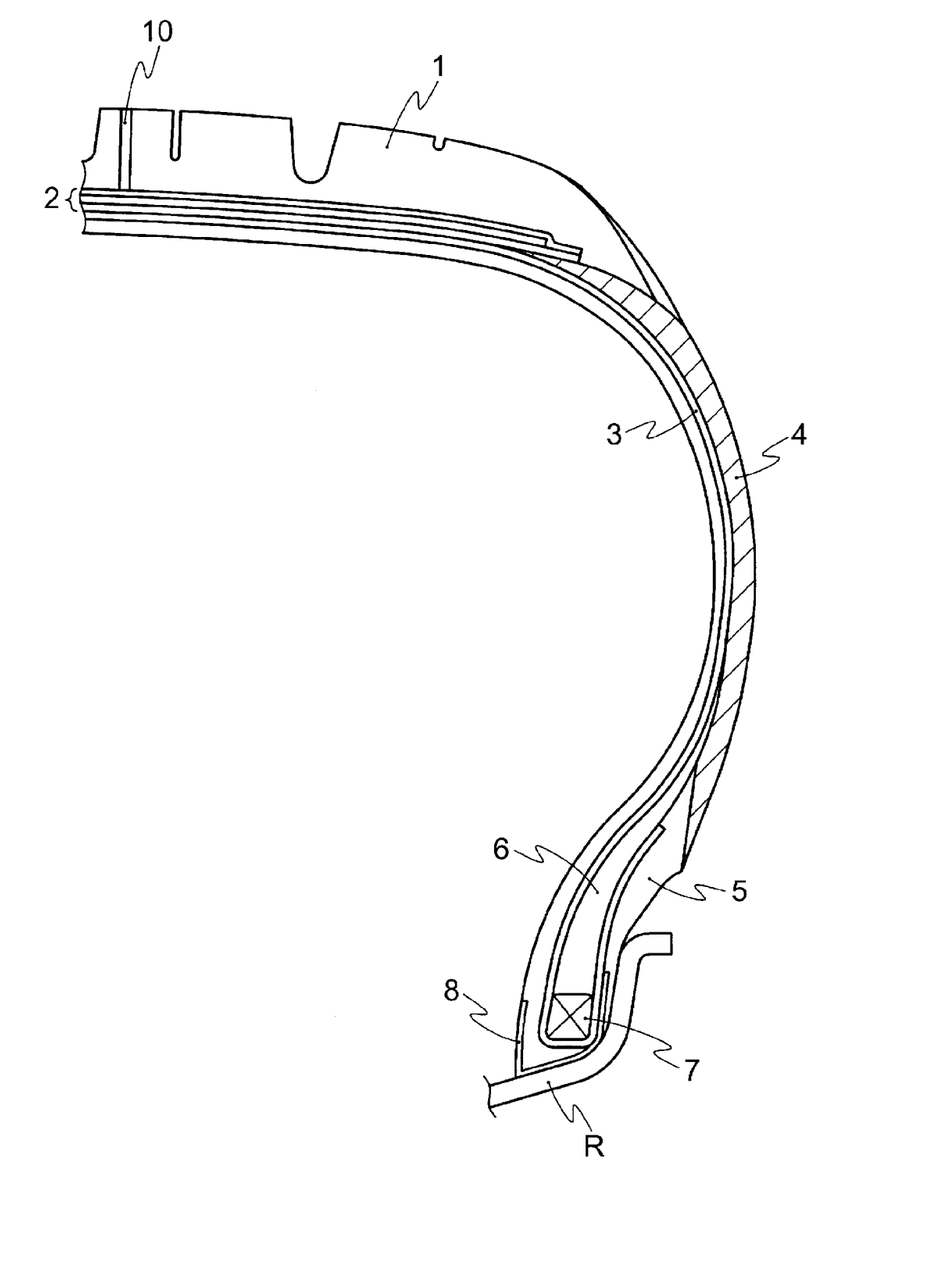
FIG. 1 A diagrammatic view of a part of a cross-section of a tire according to one embodiment of the present invention.

The tire of the present invention is explained in reference to the attached FIG. 1. FIG. 1 shows a partial view of a cross-section of a tire which is one embodiment of the present invention. The present invention, however, is not limited to this embodiment.

The tire shown in FIG. 1 is provided with a tread portion 1, a sidewall 4, a bead portion 6, a ply 3 arranged so as to pass the inside of the tread portion 1 and the sidewall 4 in a radial direction of the tire and along the bead portion 6, and a breaker layer 2 disposed between the tread portion 1 and the ply 3. The both ends of the ply 3 are folded along a pair of bead cores 7 arranged on the bead portion 6, and are locked there, and a chafer 8 is provided on a portion of the ply 3 coming into contact with a rim R. In addition, the rim R is abutting a clinch 5, and this clinch 5 is connected with the ply 3 and the sidewall 4.

Next, a discharging path from the rim R up to a ground-contacting surface of the tread 1 in the tire shown in FIG. 1 is explained.

Examples of the discharging path from the rim up to the ground surface include a "ply path" passing through the clinch 5, the ply 3, the breaker layer 2 and the tread portion 1, and a "sidewall path" passing through the clinch 5, the sidewall 4, the breaker layer 2 and the tread portion 1. If conductivity of the tread portion 1 is insufficient, the conductivity of the tire can be secured by providing a base pen 10 made of a rubber composition being excellent in conductivity on a portion from the breaker layer 2 up to the ground-contacting surface.

In the "ply path", in the case where the ply topping rubber is thin or in the case where the BET specific surface area of a carbon black contained in the ply topping rubber is small or the content of the carbon black is small, there is a problem that a volume resistivity of the ply becomes high and conduction becomes difficult. Also, in the case where a strip layer having low conductivity is provided between the ply and the breaker, there is a problem that conduction becomes difficult. Therefore, by improving conductivity of the sidewall to secure conductivity of the "sidewall path", conductivity of the tire can be improved effectively while a cost is decreased.

In the case of providing no base pen mentioned above, namely, in the case of the tread having conductivity, the volume resistivity of the tread is preferably not more than $1 \times 10^8$ $\Omega \cdot cm$, more preferably not more than $1 \times 10^7$ $\Omega \cdot cm$, further preferably not more than $1 \times 10^6$ $\Omega \cdot cm$. If the volume resistivity exceeds $1 \times 10^8$ $\Omega \cdot cm$, there arises a problem such that the tread cannot be used as an electrically conductive path, and static electricity is accumulated on a vehicle, and thereby a person riding on a vehicle receives an electric shock, a spark occurs when filling fuel to cause a fire, mixing of a noise on a radio in a vehicle during running occurs or corrosion of a rubber composition of a clinch portion due to an electrically charged rim is accelerated.

On the other hand, in the case of providing the base pen, the resistivity of the base pen is preferably not more than $1 \times 10^8$ $\Omega \cdot cm$, more preferably not more than $1 \times 10^7$ $\Omega \cdot cm$, further preferably not more than $1 \times 10^6$ $\Omega \cdot cm$. If the resistivity of the base pen exceeds $1 \times 10^8$ $\Omega \cdot cm$, the base pen cannot be used as an electrically conductive path, and there may arise the above-mentioned problems due to accumulation of static electricity on a vehicle.

EXAMPLE

The present invention is explained by means of Examples, but is not limited only thereto.

Various kinds of chemicals used in Examples and Comparative Examples are described below.

NR: TSR20

BR1 (high cis BR): BR150B manufactured by Ube Industries, Ltd., (cis content: 97% by mass, unmodified)

BR2 (SPB-containing BR): VCR617 manufactured by Ube Industries, Ltd., (content of SPB: 17% by mass, melting point of SPB: 200° C., content of insoluble matter in boiling n-hexane: 15 to 18% by mass)

BR3 (terminal-modified BR): BR1250H manufactured by Zeon Corporation (prepared by polymerization using lithium as an initiator, vinyl bond amount: 10 to 13% by mass, Mw/Mn: 1.5, content of tin atom: 250 ppm)

BR4 (rare-earth-metal-catalyzed BR): BUNA-CB24 manufactured by Lanxess AG (Nd-catalyzed BR, cis content: 96% by mass, vinyl content: 0.7% by mass, $ML_{1+4}$ (100° C.): 45, Mw/Mn: 2.69, Mw: 500,000, Mn: 186,000)

Carbon black 1: SHOBLACK N220 manufactured by CABOT Japan K. K. (N220, BET: 114 $m^2/g$)

Carbon black 2: SHOBLACK N330 manufactured by CABOT Japan K. K. (N330, BET: 78 $m^2/g$)

Carbon black 3: SHOBLACK N550 manufactured by CABOT Japan K. K. (N550, BET: 40 $m^2/g$)

Carbon black 4: Carbon Black N660 manufactured by Jiangxi Black Cat Carbon Black Inc., Ltd. (N660, BET: 35 $m^2/g$)

Silica 1: ULTRASIL U9000Gr manufactured by Evonik Degussa GmbH (BET: 230 $m^2/g$)

Silica 2: ULTRASIL VN3 manufactured by Evonik Degussa GmbH (BET: 175 $m^2/g$)

Silica 3: ULTRASIL VN2 manufactured by Evonik Degussa GmbH (BET: 125 $m^2/g$)

Silica 4: Z 1085 Gr manufactured by Rhodia Co., Ltd. (BET: 80 $m^2/g$)

Silica 5: ULTRASIL U360 manufactured by Evonik Degussa GmbH (BET: 50 $m^2/g$)

Silane coupling agent: Si75 (bis(3-triethoxysilylpropyl)disulfide) manufactured by Evonik Degussa GmbH Resin: MARUKAREZ T-100A manufactured by Maruzen Petrochemical Co., Ltd. (C5 petroleum resin: aliphatic petroleum resin mainly composed of olefins and diolefins in the C5 fraction obtained by naphtha cracking)

Oil: VIVATEC400 (TDAE oil) manufactured by H & R Co., Ltd.

Zinc oxide: ZINC FLOWER No. 1 manufactured by Mitsui Mining & Smelting Co., Ltd.

Stearic acid: Stearic acid manufactured by NOF Corporation

Wax: OZOACE 0355 manufactured by Nippon Seiro Co., Ltd.

Antioxidant 6PPD: Antigene 6C (N-phenyl-N'-(1,3-dimethylbutyl)-p-phenylenediamine) manufactured by Sumitomo Chemical Industry Co., Ltd.

Antioxidant 77PD: Vulkanox4030 (N,N'-bis(1,4-dimethylpentyl)-p-phenylenediamine) manufactured by Lanxess AG Antioxidant G-1: Nocrac G-1 (N-phenyl-N'-(3-methacryloyloxy-2-hydroxypropyl)-p-phenylenediamine) manufactured by OUCHI SHINKO CHEMICAL INDUSTRIAL CO., LTD.
Antioxidant TMQ: Nocrac 224 (Polymerized 2,2,4-trimethyl-1,2-dihydroquinoline) manufactured by OUCHI SHINKO CHEMICAL INDUSTRIAL CO., LTD.
Antioxidant NS-5: Nocrac NS-5 (2,2-methylenebis(4-ethyl-6-t-butylphenol)) manufactured by OUCHI SHINKO CHEMICAL INDUSTRIAL CO., LTD.
Insoluble sulfur (oil content: 10%): Seimi sulfur (insoluble sulfur with carbon disulfide-insoluble content of 60% or higher, oil content: 10% by mass) manufactured by NIPPON KANRYU INDUSTRY CO., LTD.
Vulcanization accelerator TBBS: Nocceler NS (N-tert-butyl-2-benzothiazolylsulfenamide) manufactured by OUCHI SHINKO CHEMICAL INDUSTRIAL CO., LTD.

Examples 1 to 24 and Comparative Examples 1 to 15

Various chemicals (except insoluble sulfur and vulcanization accelerator) shown in Tables 1 to 5 were subjected to base kneading step (discharging temperature: 150° C., 4 minutes) and re-milling step (discharging temperature: 130° C., 3 minutes) using a Banbury mixer to obtain kneaded products. Then, sulfur and vulcanization accelerator were added to the obtained kneaded products, followed by final kneading step (discharging temperature: 100° C., 2 minutes), using an open roll to obtain unvulcanized rubber compositions.

Further, the obtained unvulcanized rubber compositions were subjected to press-vulcanization at 170° C. for 12 minutes to obtain vulcanized rubber compositions. In addition, the obtained unvulcanized rubber compositions were subjected to extrusion to a shape of a sidewall, and the extruded products were laminated with other tire parts to prepare unvulcanized tires which were then subjected to press-vulcanization at 170° C. for 12 minutes to prepare tires for test (radial tires for passenger cars, size: 205/65R15).

The following tests were carried out using the above-mentioned unvulcanized rubber compositions, vulcanized rubber compositions and rubber compositions for tests.

<Viscoelasticity Test>

Complex modulus E* (MPa) and loss tangent tan δ of the above-mentioned vulcanized rubber compositions were measured by using a viscoelasticity spectrometer VES manufactured by Iwamoto Seisakusyo K.K., under the conditions of a temperature of 70° C., a frequency of 10 Hz, an initial strain of 10%, and a dynamic strain of 2%. The larger the E* is, the more excellent the steering stability is. The smaller the tan δ is, the more excellent the rolling resistance is (the rolling resistance is smaller).

The target value of E* is from 3.0 to 5.0, and the target value of tan δ is not more than 0.17.

<Volume Resistivity>

The above-mentioned vulcanized rubber compositions were cut into pieces with a length of 15 cm, a width of 15 cm, and a thickness of 2 mm, and using an electric resistance tester R8340A manufactured by Advantest Corporation, a volume resistivity was measured under the conditions of a voltage of 500 V, a temperature of 23° C., and a relative humidity of 50%.

The target value of a volume resistivity is not more than $1 \times 10^8$ Ω·cm.

<Tensile Test>

According to JIS K 6251: 2010 "Rubber, vulcanized or thermoplastic-Determination of tensile stress-strain properties", by using a No. 3 dumbbell type test piece comprising the above-mentioned vulcanized rubber composition, a tensile test was carried out at room temperature, and an EB (%) of the test piece was measured. The larger the EB is, the better the durability is. The target value of the EB is not less than 480.

<Evaluation of Spew Cutting>

With respect to cutting of spews which occurred at de-molding of the above-mentioned test tires, the number of cut spews of sidewalls of 100 or more tires was counted, and the number of cut spews for each formulation was indicated by indices obtained using the following equation. The larger index indicates that the cutting of spews hardly occurs. The target value is 100 or more.

(Index of the number of cut spews)=(The number of cut spews in Comparative Example 1)/(The number of cut spews of each formulation)×100

<Processability (Shrink Resistance and Extrusion Processability)>

(Evaluation of Anti-Shrink Property)

Shrinking of molded products obtained by molding extruded unvulcanized rubber compositions into a predetermined shape of a sidewall was evaluated with naked eyes and by tactile sense, and was indicated by indices on the assumption that the shrinking of Comparative Example 1 is 100. The larger index indicates that the shrinking hardly occurs. The target value is 90 or more.

(Extrusion Processability)

A degree of rubber burning, unevenness of edges and flatness of rubber profile of molded products were evaluated with naked eyes and by tactile sense, and was indicated by indices on the assumption that the extrusion processability of Comparative Example 1 is 100. The larger the index is, the more excellent the extrusion processability is. The target value is 90 or more.

<Cost Evaluation>

Production cost of each test tire was evaluated. The evaluation results are indicated by very low (⊚), low (○○), high (Δ) and very high (x). The production cost is lower when the contents of fillers and oil which are more inexpensive than the rubber components are larger and when the content of a silane coupling agent which is higher in cost per unit mass than other chemicals is smaller.

<Test on Crack Resistance>

A road test was carried out in United Arab Emirates in the middle and near east for about one year (including summertime), and the degree of generated cracks was evaluated in accordance with the following criteria. When the FIGURE in the evaluation criteria is larger, it indicates that the crack resistance is good. In addition, a right-hand superior mark "+" indicates that the evaluation result is better in the criterion of the same FIGURE, and the mark "−" indicates that the evaluation result is not good in the criterion of the same FIGURE.

Evaluation Criteria

1: Cracking or cutting of 3 mm or more long is found.
2: Deep cracking of 1 mm or more and less than 3 mm long is found.
3: Deep and comparatively large cracking of less than 1 mm long is found.
4: Cracking or cutting can be barely confirmed with naked eyes.

5: Cracking or cutting cannot be confirmed with naked eyes, but can be confirmed with a magnifier (×10).

<Brown Discoloration>

A tire was left at a sunny outdoor place in Kobe for six months (winter to summer), and a* and b* were measured with a differential colorimeter to evaluate brown discoloration using the measured values under the following criteria. When the FIGURE in the evaluation criteria is larger, it indicates that the effect of inhibiting brown discoloration is good. In addition, right-hand superior marks "+" and "−" are the same criteria as in the crack resistance test.

Evaluation Criteria $-(a^*+b^*) \times 10 \leq -30$ : 1

$-30 < -(a^*+b^*) \times 10 \leq -20$ : 2

$-20 < -(a^*+b^*) \times 10 \leq -10$ : 3

$-10 < -(a^*+b^*) \times 10 \leq 0$ : 4

$-(a^*+b^*) \times 10 > 0$ : 5

The results of the above-mentioned tests are shown in Tables 1 to 5.

TABLE 1

| | Example | | | | | | |
|---|---|---|---|---|---|---|---|
| | 1 | 2 | 3 | 4 | 5 | 6 | 7 |
| Compounding amount (part by mass) | | | | | | | |
| NR | 40 | 40 | 40 | 40 | 40 | 40 | 40 |
| BR1 | 60 | 60 | 60 | 60 | 60 | 60 | 60 |
| BR2 | — | — | — | — | — | — | — |
| BR3 | — | — | — | — | — | — | — |
| BR4 | — | — | — | — | — | — | — |
| Carbon black 1 | — | — | — | — | — | — | — |
| Carbon black 2 | — | — | — | — | — | — | — |
| Carbon black 3 | 48 | 49 | 47 | 45 | 58 | 59 | 57 |
| Carbon black 4 | — | — | — | — | — | — | — |
| Silica 1 | — | — | — | — | — | — | — |
| Silica 2 | 5 | 2 | 7 | 10 | 5 | 2 | 7 |
| Silica 3 | — | — | — | — | — | — | — |
| Silica 4 | — | — | — | — | — | — | — |
| Silica 5 | — | — | — | — | — | — | — |
| Silane coupling agent | — | — | — | — | — | — | — |
| Resin | 2 | 2 | 2 | 2 | 2 | 2 | 2 |
| Oil | 8 | 8 | 8 | — | 8 | 8 | 8 |
| Zinc oxide | 3 | 3 | 3 | 3 | 3 | 3 | 3 |
| Stearic acid | 2 | 2 | 2 | 2 | 2 | 2 | 2 |
| Wax | 2 | 2 | 2 | 2 | 2 | 2 | 2 |
| Antioxidant 6PPD | 3 | 3 | 3 | 3 | 3 | 3 | 3 |
| Antioxidant TMQ | 1 | 1 | 1 | 1 | 1 | 1 | 1 |
| Insoluble sulfur | 1.7 | 1.7 | 1.7 | 1.7 | 1.7 | 1.7 | 1.7 |
| Vulcanization accelerator TBBS | 0.75 | 0.75 | 0.75 | 0.75 | 0.75 | 0.75 | 0.75 |
| Total | 176.45 | 174.45 | 177.45 | 170.45 | 186.45 | 184.45 | 187.45 |
| Content of carbon black (% by mass) | 27.2 | 28.1 | 26.5 | 26.4 | 31.1 | 32.0 | 30.4 |
| Evaluation results | | | | | | | |
| Steering stability (E*) Target: 3.0 to 5.0 | 3.56 | 3.55 | 3.55 | 3.92 | 4.81 | 4.79 | 4.84 |
| Rolling resistance (tanδ) Target: 0.17 or less | 0.157 | 0.163 | 0.154 | 0.144 | 0.151 | 0.156 | 0.148 |
| Volume resistivity (Ω · cm) Target: 1 × 10$^8$ or less | 2.1 × 10$^7$ | 1.9 × 10$^7$ | 4.5 × 10$^7$ | 4.1 × 10$^7$ | 1.3 × 10$^7$ | 1.2 × 10$^7$ | 1.4 × 10$^7$ |
| EB (%) Target: 480 or more | 665 | 675 | 680 | 675 | 505 | 485 | 515 |
| Evaluation of spew cutting Target: 100 or more | 110 | 110 | 115 | 125 | 115 | 105 | 110 |
| Evaluation of shrink resistance Target: 90 or more | 100 | 100 | 95 | 105 | 100 | 100 | 95 |
| Evaluation of extrusion processability Target: 90 or more | 100 | 100 | 95 | 90 | 100 | 100 | 95 |
| Cost evaluation | ∘∘ | ∘ | ∘ | ∘ | ∘∘ | ∘∘ | ∘∘ |
| Crack resistance | 3$^+$ | 3 | 3$^+$ | 4 | 3$^+$ | 3 | 3 |
| Discoloration to brown | 4 | 3$^+$ | 4 | 5 | 4 | 3 | 4 |

| | Example | | | | | | |
|---|---|---|---|---|---|---|---|
| | 8 | 9 | 10 | 11 | 12 | 13 | 14 |
| Compounding amount (part by mass) | | | | | | | |
| NR | 40 | 40 | 40 | 40 | 40 | 40 | 40 |
| BR1 | 60 | 60 | 60 | 60 | 60 | 60 | 60 |
| BR2 | — | — | — | — | — | — | — |
| BR3 | — | — | — | — | — | — | — |
| BR4 | — | — | — | — | — | — | — |

TABLE 1-continued

| | | | | | | | |
|---|---|---|---|---|---|---|---|
| Carbon black 1 | — | — | — | — | — | — | — |
| Carbon black 2 | — | — | 40 | 42 | 45 | 50 | 55 |
| Carbon black 3 | 55 | 53 | — | — | — | — | — |
| Carbon black 4 | — | — | — | — | — | — | — |
| Silica 1 | — | — | — | — | — | — | — |
| Silica 2 | 10 | 15 | 5 | 5 | 5 | 5 | 5 |
| Silica 3 | — | — | — | — | — | — | — |
| Silica 4 | — | — | — | — | — | — | — |
| Silica 5 | — | — | — | — | — | — | — |
| Silane coupling agent | — | — | — | — | — | — | — |
| Resin | 2 | 2 | 2 | 2 | 2 | 2 | 2 |
| Oil | 8 | 8 | — | 8 | 8 | 8 | 8 |
| Zinc oxide | 3 | 3 | 3 | 3 | 3 | 3 | 3 |
| Stearic acid | 2 | 2 | 2 | 2 | 2 | 2 | 2 |
| Wax | 2 | 2 | 2 | 2 | 2 | 2 | 2 |
| Antioxidant 6PPD | 3 | 3 | 3 | 3 | 3 | 3 | 3 |
| Antioxidant TMQ | 1 | 1 | 1 | 1 | 1 | 1 | 1 |
| Insoluble sulfur | 1.7 | 1.7 | 1.7 | 1.7 | 1.7 | 1.7 | 1.7 |
| Vulcanization accelerator TBBS | 0.75 | 0.75 | 0.75 | 0.75 | 0.75 | 0.75 | 0.75 |
| Total | 188.45 | 191.45 | 160.45 | 170.45 | 173.45 | 178.45 | 183.45 |
| Content of carbon black (% by mass) | 29.2 | 27.7 | 24.9 | 24.6 | 25.9 | 28.0 | 30.0 |
| Evaluation results | | | | | | | |
| Steering stability (E*) Target: 3.0 to 5.0 | 4.79 | 4.77 | 4.75 | 4.35 | 4.65 | 5.00 | 5.47 |
| Rolling resistance (tanδ) Target: 0.17 or less | 0.146 | 0.140 | 0.135 | 0.144 | 0.155 | 0.165 | 0.179 |
| Volume resistivity (Ω · cm) Target: $1 \times 10^8$ or less | $1.5 \times 10^7$ | $2.0 \times 10^7$ | $2.7 \times 10^7$ | $4.1 \times 10^7$ | $1.2 \times 10^7$ | $1.1 \times 10^7$ | $8.5 \times 10^6$ |
| EB (%) Target: 480 or more | 525 | 535 | 655 | 645 | 625 | 575 | 525 |
| Evaluation of spew cutting Target: 100 or more | 105 | 110 | 120 | 110 | 105 | 100 | 100 |
| Evaluation of shrink resistance Target: 90 or more | 100 | 90 | 110 | 105 | 100 | 95 | 90 |
| Evaluation of extrusion processability Target: 90 or more | 100 | 90 | 100 | 105 | 100 | 95 | 90 |
| Cost evaluation | ∘∘ | ∘∘ | ∘ | ∘ | ∘ | ∘ | ∘∘ |
| Crack resistance | 3+ | 3+ | 3+ | 3+ | 3+ | 3+ | 3 |
| Discoloration to brown | 4 | 4 | 4+ | 4 | 4 | 4 | 4 |

TABLE 2

| | Example | | | | | | | | | |
|---|---|---|---|---|---|---|---|---|---|---|
| | 15 | 16 | 17 | 18 | 19 | 20 | 21 | 22 | 23 | 24 |
| Compounding amount (part by ass) | | | | | | | | | | |
| NR | 40 | 40 | 40 | 40 | 40 | 40 | 40 | 60 | 35 | 70 |
| BR1 | 60 | 60 | 60 | 60 | 60 | 60 | 60 | — | — | — |
| BR2 | — | — | — | — | — | — | — | 20 | — | — |
| BR3 | — | — | — | — | — | — | — | 20 | — | — |
| BR4 | — | — | — | — | — | — | — | — | 65 | 30 |
| Carbon black 1 | — | — | — | 10 | 14 | — | — | — | — | — |
| Carbon black 2 | — | — | — | — | — | — | — | — | — | — |
| Carbon black 3 | 48 | 48 | 48 | 35 | 40 | 48 | 48 | 48 | 48 | 48 |
| Carbon black 4 | — | — | — | — | — | 14 | — | — | — | — |
| Silica 1 | — | — | 5 | — | — | — | — | — | — | — |
| Silica 2 | — | — | — | 5 | 5 | 5 | 5 | 5 | 5 | 5 |
| Silica 3 | 5 | — | — | — | — | — | — | — | — | — |
| Silica 4 | — | 5 | — | — | — | — | — | — | — | — |
| Silica 5 | — | — | — | — | — | — | — | — | — | — |
| Silane coupling agent | — | — | — | — | — | — | — | — | — | — |
| Resin | 2 | 2 | 2 | 2 | 2 | 2 | 2 | 2 | 2 | 2 |
| Oil | 8 | 8 | 8 | 8 | 8 | 8 | — | 8 | 8 | 8 |
| Zinc oxide | 3 | 3 | 3 | 3 | 3 | 3 | 3 | 3 | 3 | 3 |
| Stearic acid | 2 | 2 | 2 | 2 | 2 | 2 | 2 | 2 | 2 | 2 |
| Wax | 2 | 2 | 2 | 2 | 2 | 2 | 2 | 2 | 2 | 2 |
| Antioxidant 6PPD | 3 | 3 | 3 | 3 | 3 | 3 | 3 | 3 | 3 | 3 |
| Antioxidant TMQ | 1 | 1 | 1 | 1 | 1 | 1 | 1 | 1 | 1 | 1 |

TABLE 2-continued

|  | Example | | | | | | | | | |
|---|---|---|---|---|---|---|---|---|---|---|
|  | 15 | 16 | 17 | 18 | 19 | 20 | 21 | 22 | 23 | 24 |
| Insoluble sulfur | 1.7 | 1.7 | 1.7 | 1.7 | 1.7 | 1.7 | 1.7 | 1.7 | 1.7 | 1.7 |
| Vulcanization accelerator TBBS | 0.75 | 0.75 | 0.75 | 0.75 | 0.75 | 0.75 | 0.75 | 0.75 | 0.75 | 0.75 |
| Total | 176.45 | 176.45 | 176.45 | 173.45 | 182.45 | 190.45 | 168.45 | 176.45 | 176.45 | 176.45 |
| Content of carbon black (% by mass) | 27.2 | 27.2 | 27.2 | 25.9 | 29.6 | 32.6 | 28.5 | 27.2 | 27.2 | 27.2 |
| Evaluation results |  |  |  |  |  |  |  |  |  |  |
| Steering stability (E*) Target: 3.0 to 5.0 | 3.51 | 3.49 | 3.61 | 3.48 | 4.82 | 4.72 | 3.89 | 3.95 | 3.67 | 3.42 |
| Rolling resistance (tanδ) Target: 0.17 or less | 0.154 | 0.151 | 0.157 | 0.142 | 0.145 | 0.153 | 0.149 | 0.115 | 0.142 | 0.148 |
| Volume resistivity (Ω · cm) Target: $1 \times 10^8$ or less | $2.2 \times 10^7$ | $2.1 \times 10^7$ | $2.3 \times 10^7$ | $1.6 \times 10^7$ | $1.1 \times 10^7$ | $1.3 \times 10^7$ | $1.4 \times 10^7$ | $2.9 \times 10^7$ | $1.9 \times 10^7$ | $1.9 \times 10^7$ |
| EB (%) Target: 480 or more | 655 | 650 | 670 | 680 | 535 | 500 | 685 | 645 | 655 | 695 |
| Evaluation of spew cutting Target: 100 or more | 110 | 110 | 110 | 115 | 120 | 105 | 115 | 120 | 115 | 115 |
| Evaluation of shrink resistance Target: 90 or more | 100 | 105 | 100 | 95 | 105 | 100 | 105 | 110 | 105 | 100 |
| Evaluation of extrusion processability Target: 90 or more | 100 | 105 | 100 | 100 | 100 | 95 | 90 | 105 | 90 | 100 |
| Cost evaluation | ○ | ○ | ○ | ○ | ○ | ○○ | ○ | ○ | ○ | ○ |
| Crack resistance | 3+ | 3 | 3 | 3+ | 3 | 3 | 3+ | 3+ | 3+ | 3+ |
| Discoloration to brown | 4 | 4 | 4 | 4 | 4 | 4 | 4+ | 4 | 4 | 4 |

TABLE 3

|  | Comparative Example | | | | | | | | |
|---|---|---|---|---|---|---|---|---|---|
|  | 1 | 2 | 3 | 4 | 5 | 6 | 7 | 8 | 9 |
| Compounding amount (part by mass) |  |  |  |  |  |  |  |  |  |
| NR | 40 | 40 | 40 | 40 | 40 | 40 | 40 | 40 | 40 |
| BR1 | 60 | 60 | 60 | 60 | 60 | 60 | 60 | 60 | 60 |
| BR2 | — | — | — | — | — | — | — | — | — |
| BR3 | — | — | — | — | — | — | — | — | — |
| BR4 | — | — | — | — | — | — | — | — | — |
| Carbon black 1 | — | — | — | — | — | — | — | — | — |
| Carbon black 2 | — | — | — | — | — | — | — | — | — |
| Carbon black 3 | 50 | 60 | — | — | — | 25 | 66 | 25 | 48 |
| Carbon black 4 | — | — | 48 | 54 | 58 | — | — | — | — |
| Silica 1 | — | — | — | — | — | — | — | — | — |
| Silica 2 | — | — | 5 | 5 | 5 | 15 | 2 | 20 | — |
| Silica 3 | — | — | — | — | — | — | — | — | — |
| Silica 4 | — | — | — | — | — | — | — | — | — |
| Silica 5 | — | — | — | — | — | — | — | — | 5 |
| Silane coupling agent | — | — | — | — | — | — | — | — | — |
| Resin | 2 | 2 | 2 | 2 | 2 | 2 | 2 | 2 | 2 |
| Oil | 8 | 8 | 8 | 8 | 8 | 8 | 8 | 8 | 8 |
| Zinc oxide | 3 | 3 | 3 | 3 | 3 | 3 | 3 | 3 | 3 |
| Stearic acid | 2 | 2 | 2 | 2 | 2 | 2 | 2 | 2 | 2 |
| Wax | 2 | 2 | 2 | 2 | 2 | 2 | 2 | 2 | 2 |
| Antioxidant 6PPD | 3 | 3 | 3 | 3 | 3 | 3 | 3 | 3 | 3 |
| Antioxidant TMQ | 1 | 1 | 1 | 1 | 1 | 1 | 1 | 1 | 1 |
| Insoluble sulfur | 1.7 | 1.7 | 1.7 | 1.7 | 1.7 | 1.7 | 1.7 | 1.7 | 1.7 |
| Vulcanization accelerator TBBS | 0.75 | 0.75 | 0.75 | 0.75 | 0.75 | 0.75 | 0.75 | 0.75 | 0.75 |
| Total | 173.45 | 183.45 | 176.45 | 182.45 | 186.45 | 163.45 | 191.45 | 168.45 | 176.45 |
| Content of carbon black (% by mass) | 28.8 | 32.7 | 27.2 | 29.6 | 31.1 | 15.3 | 34.5 | 14.8 | 27.2 |
| Evaluation results |  |  |  |  |  |  |  |  |  |
| Steering stability (E*) Target: 3.0 to 5.0 | 3.55 | 4.84 | 3.15 | 3.84 | 4.34 | 2.97 | 5.60 | 3.12 | 3.47 |
| Rolling resistance (tanδ) Target: 0.17 or less | 0.165 | 0.157 | 0.131 | 0.123 | 0.132 | 0.092 | 0.175 | 0.099 | 0.159 |

TABLE 3-continued

| | Comparative Example | | | | | | | | |
|---|---|---|---|---|---|---|---|---|---|
| | 1 | 2 | 3 | 4 | 5 | 6 | 7 | 8 | 9 |
| Volume resistivity (Ω · cm) Target: $1 \times 10^8$ or less | $1.8 \times 10^7$ | $1.2 \times 10^7$ | $4.5 \times 10^{10}$ | $4.5 \times 10^8$ | $8.5 \times 10^7$ | $2.1 \times 10^{16}$ | $1.1 \times 10^7$ | $6.1 \times 10^{16}$ | $2.7 \times 10^7$ |
| EB (%) Target: 480 or more | 635 | 465 | 525 | 475 | 445 | 565 | 425 | 495 | 605 |
| Evaluation of spew cutting Target: 100 or more | 100 | 85 | 90 | 85 | 75 | 70 | 60 | 70 | 100 |
| Evaluation of shrink resistance Target: 90 or more | 100 | 105 | 100 | 105 | 105 | 65 | 100 | 40 | 105 |
| Evaluation of extrusion processability Target: 90 or more | 100 | 100 | 90 | 100 | 100 | 70 | 70 | 50 | 85 |
| Cost evaluation | Δ | ○○ | ○ | ○ | ○○ | x | ○○ | x | Δ |
| Crack resistance | 3 | 3 | 3+ | 3 | 2+ | 3 | 2 | 3 | 3 |
| Discoloration to brown | 3 | 3 | 4 | 4 | 4 | 4 | 3 | 4+ | 3 |

TABLE 4

| | Comparative Example | | | | | | | |
|---|---|---|---|---|---|---|---|---|
| | 10 | 11 | 12 | 13 | 14 | 15 | 16 | 17 |
| Compounding amount (part by mass) | | | | | | | | |
| NR | 40 | 40 | 40 | 40 | 40 | 40 | 40 | 40 |
| BR1 | 60 | 60 | 60 | 60 | 60 | 60 | 60 | 60 |
| BR2 | — | — | — | — | — | — | — | — |
| BR3 | — | — | — | — | — | — | — | — |
| BR4 | — | — | — | — | — | — | — | — |
| Carbon black 1 | — | — | — | — | — | — | — | — |
| Carbon black 2 | 39 | 35 | 63 | 71 | — | — | — | — |
| Carbon black 3 | — | — | — | — | 48 | 43 | 50 | 50 |
| Carbon black 4 | — | — | — | — | — | — | — | — |
| Silica 1 | — | — | — | — | — | — | — | — |
| Silica 2 | 5 | 5 | 2 | 2 | 5 | 15 | — | — |
| Silica 3 | — | — | — | — | — | — | — | — |
| Silica 4 | — | — | — | — | — | — | — | — |
| Silica 5 | — | — | — | — | — | — | — | — |
| Silane coupling agent | — | — | — | — | 0.5 | 1.5 | — | — |
| Resin | 2 | 2 | 2 | 2 | 2 | 2 | 2 | 2 |
| Oil | 8 | 8 | 8 | 8 | 8 | 8 | 8 | 8 |
| Zinc oxide | 3 | 3 | 3 | 3 | 3 | 3 | 3 | 3 |
| Stearic acid | 2 | 2 | 2 | 2 | 2 | 2 | 2 | 2 |
| Wax | 2 | 2 | 2 | 2 | 2 | 2 | 2 | 2 |
| Antioxidant 6PPD | 3 | 3 | 3 | 3 | 3 | 3 | 4 | 6 |
| Antioxidant TMQ | 1 | 1 | 1 | 1 | 1 | 1 | 1 | 1 |
| Insoluble sulfur | 1.7 | 1.7 | 1.7 | 1.7 | 1.7 | 1.7 | 1.7 | 1.7 |
| Vulcanization accelerator TBBS | 0.75 | 0.75 | 0.75 | 0.6 | 0.75 | 0.75 | 0.75 | 0.75 |
| Total | 168.45 | 163.45 | 183.45 | 196.3 | 176.95 | 182.95 | 174.45 | 176.45 |
| Content of carbon black (% by mass) | 23.2 | 21.4 | 34.3 | 36.2 | 27.1 | 23.5 | 28.7 | 28.3 |
| Evaluation results | | | | | | | | |
| Steering stability (E*) Target: 3.0 to 5.0 | 4.18 | 3.45 | 5.68 | 5.70 | 3.57 | 3.59 | 3.54 | 3.50 |
| Rolling resistance (tanδ) Target: 0.17 or less | 0.137 | 0.121 | 0.187 | 0.224 | 0.156 | 0.142 | 0.169 | 0.177 |
| Volume resistivity (Ω · cm) Target: $1 \times 10^8$ or less | $3.5 \times 10^8$ | $4.5 \times 10^{11}$ | $7.9 \times 10^6$ | $1.2 \times 10^6$ | $2.1 \times 10^7$ | $4.9 \times 10^{13}$ | $1.8 \times 10^7$ | $1.8 \times 10^7$ |
| EB (%) Target: 480 or more | 650 | 555 | 455 | 425 | 660 | 695 | 635 | 630 |
| Evaluation of spew cutting Target: 100 or more | 110 | 80 | 70 | 60 | 110 | 120 | 105 | 105 |
| Evaluation of shrink resistance Target: 90 or more | 100 | 95 | 100 | 110 | 100 | 90 | 100 | 100 |
| Evaluation of extrusion processability Target: 90 or more | 105 | 95 | 50 | 40 | 100 | 90 | 100 | 100 |
| Cost evaluation | x | x | ○○ | ○○ | x | x | Δ | Δ |
| Crack resistance | 3 | 3+ | 3 | 2 | 3+ | 4 | 4 | 5 |
| Discoloration to brown | 3 | 4 | 4 | 3 | 4 | 4+ | 2 | 1 |

TABLE 5

| | Example | | | | | | | | | | |
|---|---|---|---|---|---|---|---|---|---|---|---|
| | 25 | 26 | 27 | 28 | 29 | 30 | 31 | 32 | 33 | 34 | 35 |
| Compounding amount (part by mass) | | | | | | | | | | | |
| NR | 40 | 40 | 40 | 40 | 40 | 40 | 40 | 40 | 40 | 40 | 40 |
| BR1 | 60 | 60 | 60 | 60 | 60 | 60 | 60 | 60 | 60 | 60 | 60 |
| BR2 | — | — | — | — | — | — | — | — | — | — | — |
| BR3 | — | — | — | — | — | — | — | — | — | — | — |
| BR4 | — | — | — | — | — | — | — | — | — | — | — |
| Carbon black 1 | — | — | — | — | — | — | — | — | — | — | — |
| Carbon black 2 | — | — | — | — | — | — | — | — | — | — | — |
| Carbon black 3 | 48 | 49 | 47 | 45 | 48 | 45 | 45 | 48 | 48 | 48 | 48 |
| Carbon black 4 | — | — | — | — | — | — | — | — | — | — | — |
| Silica 1 | — | — | — | — | — | — | — | — | — | — | — |
| Silica 2 | 5 | 2 | 7 | 10 | 5 | 10 | 10 | 5 | 5 | 5 | 5 |
| Silane coupling agent | — | — | — | — | — | — | — | — | — | — | — |
| Resin | 2 | 2 | 2 | 2 | 2 | 2 | 2 | 2 | 2 | 2 | 2 |
| Oil | 8 | 8 | 8 | — | 8 | — | — | 8 | 8 | 8 | 8 |
| Zinc oxide | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 |
| Wax | 2 | 2 | 2 | 2 | 2 | 2 | 2 | 2 | 2 | 2 | 2 |
| Antioxidant 6PPD | 4 | 4 | 4 | 4 | 6 | 4 | 6 | 1 | 2 | 4 | 2 |
| Antioxidant 77PD | — | — | — | — | — | — | — | — | 2 | — | — |
| Antioxidant G-1 | — | — | — | — | — | — | — | — | — | — | 2 |
| Antioxidant TMQ | 1 | 1 | 1 | 1 | 1 | 1 | 1 | 1 | 1 | — | 1 |
| Antioxidant NS-5 | — | — | — | — | — | — | — | — | — | 1 | — |
| Insoluble sulfur | 1.7 | 1.7 | 1.7 | 1.7 | 1.7 | 1.7 | 1.7 | 1.7 | 1.7 | 1.7 | 1.7 |
| Vulcanization accelerator TBBS | 0.75 | 0.75 | 0.75 | 0.75 | 0.75 | 0.75 | 0.75 | 0.75 | 0.75 | 0.75 | 0.75 |
| Total | 177.45 | 175.45 | 178.45 | 171.45 | 179.45 | 171.45 | 173.45 | 174.45 | 177.45 | 177.45 | 177.45 |
| Content of carbon black (% by mass) | 27.0 | 27.9 | 26.3 | 26.2 | 26.7 | 26.2 | 25.9 | 27.5 | 27.0 | 27.0 | 27.0 |
| Evaluation results | | | | | | | | | | | |
| Steering stability (E*) Target: 3.0 to 5.0 | 3.55 | 3.51 | 3.51 | 3.89 | 3.49 | 3.82 | 3.80 | 3.59 | 3.56 | 3.56 | 3.56 |
| Rolling resistance (tanδ) Target: 0.17 or less | 0.158 | 0.165 | 0.155 | 0.147 | 0.164 | 0.151 | 0.155 | 0.151 | 0.157 | 0.158 | 0.157 |
| Volume resistivity (Ω · cm) Target: $1 \times 10^8$ or less | $2.1 \times 10^7$ | $1.9 \times 10^7$ | $4.5 \times 10^7$ | $4.1 \times 10^7$ | $2.3 \times 10^7$ | $4.2 \times 10^7$ | $4.2 \times 10^7$ | $2.1 \times 10^7$ | $2.1 \times 10^7$ | $2.1 \times 10^7$ | $2.1 \times 10^7$ |
| EB (%) Target: 480 or more | 670 | 680 | 685 | 680 | 670 | 675 | 675 | 665 | 670 | 670 | 670 |
| Evaluation of spew cutting Target: 100 or more | 115 | 115 | 120 | 130 | 115 | 130 | 130 | 100 | 115 | 115 | 115 |
| Evaluation of shrink resistance Target: 90 or more | 100 | 100 | 95 | 105 | 100 | 105 | 105 | 100 | 100 | 100 | 100 |
| Evaluation of extrusion processability Target: 90 or more | 100 | 100 | 95 | 90 | 100 | 90 | 90 | 100 | 100 | 100 | 100 |
| Cost evaluation | ∘∘ | ∘ | ∘ | ∘ | ∘ | ∘ | ∘− | ∘∘ | ∘ | ∘ | ∘ |
| Crack resistance | 4+ | 4 | 4+ | 5 | 5 | 5 | 5 | 1 | 5 | 4+ | 5 |
| Discoloration to brown | 4 | 3 | 4 | 5 | 3+ | 5 | 4+ | 5 | 5 | 5 | 5 |

As shown in Tables 1, 2 and 5, in Examples where a specific wet processed silica and a specific carbon black are contained in predetermined amounts and a silane coupling agent is not contained, it is seen that a volume resistivity is not more than $1 \times 10^8$ Ω·cm, anti-spew cutting property and extrusion processability are excellent in good balance, and the result of cost evaluation is good.

On the other hand, it is seen from Tables 3 and 4 that in Comparative Example 1 where the rubber composition is of usual formulation for a rubber composition for a sidewall, the result of cost evaluation is not good. It is seen that in Comparative Example 2 where a carbon black is contained in a larger amount as compared with Comparative Example 1, elongation at break and anti-spew-cutting property are not good. It is seen that in Comparative Examples 3 to 9 where a specific wet processed silica and a specific carbon black are not contained in predetermined amounts, conductivity, anti-spew-cutting property and extrusion processability are not improved in good balance. It is seen that in Comparative Examples 13 and 14 where a silane coupling agent is contained, the result of cost evaluation is not good.

EXPLANATION OF SYMBOLS

1 Tread portion
2 Breaker layer
3 Ply
4 Sidewall
5 Clinch
6 Bead portion
7 Bead core
8 Chafer
10 Base pen
R Rim

The invention claimed is:

1. A rubber composition for a sidewall, comprising
 2 to 15 parts by mass of a wet processed silica having a BET specific surface area of 70 to 250 m²/g, and
 40 to 62 parts by mass of a carbon black having a BET specific surface area of 37 to 125 m²/g based on 100 parts by mass of a diene rubber component,
 wherein the diene rubber component contains 70 to 30% by mass of natural rubber and 30 to 70% by mass of butadiene rubber
 wherein the rubber composition comprises 2.5 to 10 parts by mass of a phenylenediamine antioxidant based on 100 parts by mass of a diene rubber component and 2,2,4-trimethyl-1,2-dihydroquinoline polymer, contains only the wet processed silica and the carbon black as fillers, does not contain a silane coupling agent, and has a volume resistivity of less than $1 \times 10^8$ Ω·cm.

2. The rubber composition for a sidewall of claim 1, wherein a content of 2,2,4-trimethyl-1,2-dihydroquinoline polymer is from 0.1 to 4.0 parts by mass based on 100 parts by mass of the rubber component.

3. The rubber composition for a sidewall of claim 1, wherein the BET specific surface area of the carbon black is from 37 to 50 m²/g, and
 the content of the carbon black is from 40 to 60 parts by mass based on 100 parts by mass of the rubber component, and is from 26 to 36% by mass in the rubber composition.

4. The rubber composition for a sidewall of claim 1, wherein the BET specific surface area of the carbon black is from 65 to 85 m²/g, and
 the content of the carbon black is from 40 to 55 parts by mass based on 100 parts by mass of the rubber component, and is from 24.5 to 36% by mass in the rubber composition.

5. A tire having a sidewall comprising the rubber composition for a sidewall of claim 1.

6. A tire having a sidewall comprising the rubber composition for a sidewall of claim 2.

7. A tire having a sidewall comprising the rubber composition for a sidewall of claim 3.

8. An all-steel radial tire having a sidewall comprising the rubber composition for a sidewall of claim 4.

* * * * *